United States Patent [19]

Dufresne et al.

[11] Patent Number: 5,085,763

[45] Date of Patent: Feb. 4, 1992

[54] CATALYST AND ITS USE FOR A CATALYTIC DEWAXING PROCESS

[75] Inventors: Pierre Dufresne, Rueil Malmaison; Henri Kessler, Wittenheim; Jean-Louis Guth, Mulhouse, all of France

[73] Assignee: Institut Francais Du Petrole, Malmaison, France

[21] Appl. No.: 440,875

[22] Filed: Nov. 24, 1989

[30] Foreign Application Priority Data

Nov. 24, 1988 [FR] France .................. 88 15500

[51] Int. Cl.5 .............................................. C10G 11/05
[52] U.S. Cl. ................................... 208/120; 208/111; 502/64
[58] Field of Search ............. 208/111, 115, 27; 502/64

[56] References Cited

U.S. PATENT DOCUMENTS

| | | | |
|---|---|---|---|
| 3,429,937 | 2/1969 | Blackley et al. | 208/27 |
| 3,702,886 | 11/1972 | Argauer | 502/77 |
| 4,500,419 | 4/1985 | Miale et al. | 208/115 |
| 4,585,641 | 4/1986 | Barri et al. | 502/61 |
| 4,923,835 | 5/1990 | Travers et al. | 502/74 |
| 4,937,399 | 6/1990 | Wachter et al. | 208/115 |
| 4,940,532 | 7/1990 | Peer et al. | 208/138 |
| 4,946,813 | 8/1990 | Shum | 502/66 |

*Primary Examiner*—Anthony McFarlane
*Attorney, Agent, or Firm*—Antonelli, Terry Stout & Kraus

[57] ABSTRACT

A process for dewaxing of petroleum fractions involves contacting a petroleum fraction charge under appropriate dewaxing conditions with a catalyst containing a zeolite of the MFI structure or a silica with MFI framework topology, the zeolite or the silica having been synthesized in a fluoride medium and having a fluoride content between approximately 0.02 and 1.5% by weight and being characterized by an X-ray diffraction diagram as shown in Table 1 of the specification, a matrix and at least one group VIII or VI B metal of the periodic classification of elements.

5 Claims, 2 Drawing Sheets

CATALYST AND ITS USE FOR A CATALYTIC DEWAXING PROCESS

BACKGROUND OF THE INVENTION

The present invention relates to a process for the treatment of petroleum charges and in particular to the dewaxing of hydrocarbons with an improvement to the cold behaviour of petroleum fractions or cuts, e.g. of a gas oil. The invention also relates to the novel catalyst used.

This novel catalyst contains a zeolite from the MFI group or a silica with a structure close to that of MFI, particularly suitable for the selective elimination of normal or slightly isomerized waxes from a petroleum charge.

In efforts to increase the production of light products at the expense of the residual fuel, the refiner seeks to increase the final distillation point of the distillate and the gas oil. However, besides the need not to exceed a certain sulphur content, the major difficulty is the cold behaviour of the gas oil.

These are in fact the characteristics which, most of the time, limit the production of gas oil or domestic fuel oil. They are defined by two standards:

AFNOR no. T 60 105 for the flow point (F.P.) and the turbidity point (T.P.);

AFNOR no. M 07 042 for the filtrability limit temperature (F.L.T.).

The turbidity point in °C. is the temperature at which the first wax crystals appear, whilst the flow point corresponds to the complete setting or solidification of the product. The limit filtrability temperature, intermediate between the two preceding characteristics, is linked with the "pumpability" of the gas oil through a filter under standard conditions.

It is universally accepted that the problems caused by the cold behaviour of gas oils are linked with their content of longchain, linear waxes, whose content generally varies between 10 and 40% by weight.

One of the ways of making it possible to improve the flow properties of gas oils consists of incorporating additives into them, but this method has limited effects. Although it makes it possible to modify the filtrability point and the flow point, it is known to have little effect on the turbidity point. In addition, it should be noted that the action of additives is sometimes very small on certain crude oils.

SUMMARY OF THE INVENTION

Good results can be obtained in catalytic dewaxing by using a catalyst based on a solid having an adequate geometrical selectivity. The MFI structure solids, in the form of particular silicas or zeolites, are particularly suitable to allow the rapid diffusion of normal waxes compared with isomerized waxes. Thus, solids of the MFI type make it possible to select normal waxes with respect to isomerized waxes.

Thus, the present invention relates to a catalytic dewaxing catalyst incorporating a zeolite or a silica with a MFI structure synthesized in a fluoride medium. Synthesis in fluoride media of this MFI structure zeolite type has already been described in French patent 2567868 (EP-A-172068) and in European patent application 88 401 871 4 of July 20, 1988.

BRIEF DESCRIPTION OF THE DRAWINGS

FIG. 1 showing the spectrum of one synthesized in an alkaline medium and

FIGS. 2 and 3 showing the spectrum of one prepared in a fluoride medium.

DETAILED DESCRIPTION OF THE INVENTION

Figure 1:
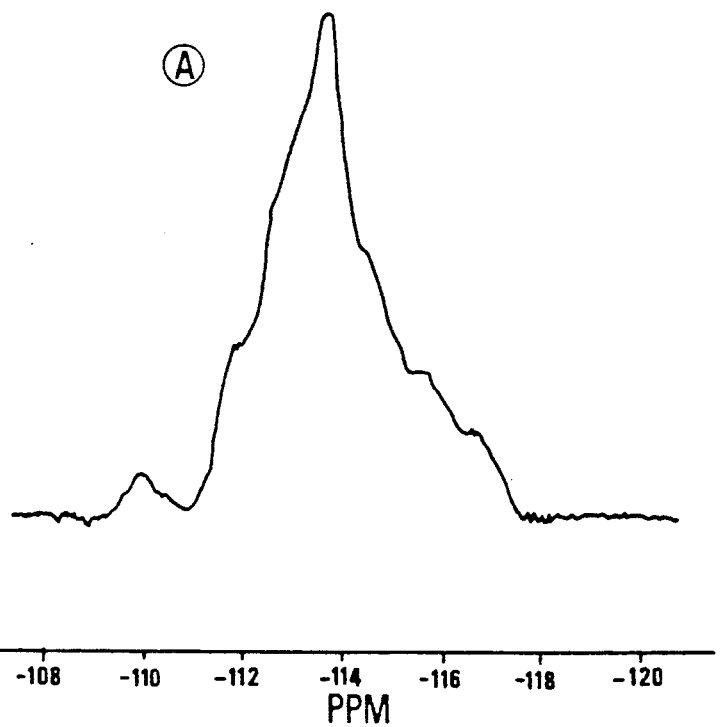
FIGS. 1 and 2 and 3, respectively, show X-ray diffraction diagrams, having crystallized silicas with a MFI structure.

The characteristics of the X-ray diffraction spectrum of MFI structure solids according to the present invention are shown in the following table:

TABLE

| $d_{hkl}$ (Å) ($10^{-10}$m) | $I/I_o$ | $d_{hkl}$ (Å) ($10^{-10}$m) | $I/I_o$ | $d_{hkl}$ (Å) ($10^{-10}$m) | $I/I_o$ |
|---|---|---|---|---|---|
| 11.08–11.26 | FF | 4.06–4.10 | ff | 2.772–2.793 | ff |
| 9.94–10.20 | mf | 3.99–4.05 | f | 2.725–2.749 | ff |
| 9.68–9.90 | f | 3.83–3.89 | F | 2.677–2.697 | ff |
| 8.98–9.08 | ff | 3.80–3.86 | m | 2.458–2.670 | ff |
| 8.00–8.09 | ff | 3.74–3.78 | mf | 2.605–2.619 | ff |
| 7.40–7.52 | ff | 3.70–3.74 | mf | 2.581–2.597 | ff |
| 7.03–7.22 | ff | 3.63–3.67 | mf | 2.545–2.557 | ff |
| 6.64–6.84 | f | 3.58–3.62 | ff | 2.508–2.526 | ff |
| 6.30–6.42 | f | 3.46–3.50 | ff | 2.479–2.501 | ff |
| 5.95–6.07 | f | 3.42–3.46 | f | 2.407–2.419 | ff |
| 5.67–5.79 | f | 3.38–3.42 | ff | 2.393–2.401 | ff |
| 5.54–5.61 | f | 3.33–3.37 | f | 2.326–2.340 | ff |
| 5.32–5.42 | ff | 3.29–3.33 | ff | 2.314–2.332 | ff |
| 5.10–5.23 | ff | 3.23–3.27 | ff | 2.195–2.209 | ff |
| 5.01–5.08 | f | 3.16–3.20 | ff | 2.104–2.120 | ff |
| 4.95–5.03 | f | 3.12–3.16 | ff | 2.077–2.095 | ff |
| 4.84–4.93 | ff | 3.08–3.12 | ff | 2.070–2.084 | ff |
| 4.59–4.64 | ff | 3.03–3.07 | f | 2.004–2.022 | f |
| 4.44–4.50 | ff | 2.976–3.020 | f | 1.985–2.005 | f |
| 4.34–4.40 | f | 2.943–2.962 | f | 1.944–1.964 | ff |
| 4.23–4.29 | f | 2.855–2.881 | ff | 1.907–1.922 | ff |
|  |  |  |  | 1.866–1.881 | ff |

FF = very strong; F = strong; mF = medium to strong; m = medium; mf = medium to weak; f = weak; ff = very weak.

The solids obtained by this synthesis procedure have a MFI crystallographic structure. Their X-ray diffraction diagrams have characteristics corresponding to the specifications of table 1. These MFI structure solids generally have as the approximate chemical formula, after calcination and expressed in oxide form:

$$M_{2/n}O, xAl_2O_3, ySiO_2$$

in which the ratio y/x can assume any value higher than 10 and in which M represents the compensation cation or cations of valency n. These solids obtained by this synthesis procedure also contain fluorine with a content generally between 0.02 and 2% by weight. A particular case of such syntheses is that in which x is equal to zero, i.e. where the synthesis is performed in the absence of aluminium, the product obtained then being a polymorphous silica of the MFI type structure.

These solids differ from prior art MFI structure solids in several respects.

The first is that the thermal stability is much greater than that conventionally obtained in the case of MFI type solids synthesized in an alkaline medium. Thus, a comparison was made between two solids with a Si/Al ratio equal to 240, one having been obtained by synthesis in an alkaline medium and the other in a fluoride medium, on the basis of a thermal stability test. This test consists of heating solids to a given temperature for 4 hours under a moist atmosphere (water/nitrogen mixture with 10% water and a partial water pressure of 10 kPa).

The zeolite synthesized in the fluoride medium retains a larger specific surface after treatment at elevated temperature, as is apparent from table 2.

TABLE 2

| Synthesis Medium | Temperature (°C.) | 600 | 900 | 1000 | 1100 | 1200 |
|---|---|---|---|---|---|---|
| OH— | Specific | 370 | 354 | 146 | 22 | 5 |
| F— | surface (m²/g) | 339 | 335 | 328 | 263 | 68 |

The crystal lattice is only destroyed for temperatures approaching 1200° C. under these conditions, whereas the standard MFI type solids synthesized in an alkaline medium start to be destroyed at about 1000° C.

This thermal stability difference between solids synthesized in a OH- or F- medium can be explained on the basis of the following hypothesis. The MFI structure solids synthesized in the alkaline medium contain large amounts of internal hydroxyl vacancies, i.e. tetrahedral positions unoccupied by silicon or aluminum atoms. These atomic vacancies are structural embrittlement points. However, solids synthesized in the fluoride medium are substantially free from such atomic vacancies. The absence or presence of atomic vacancies has been revealed by nuclear magnetic resonance (NMR) of Silicon 29. This made it possible to differentiate the different silicon atoms on the basis of their crystallographic environment on the one hand and electronic environment on the other. The MFI structure crystallized solids have different crystallographic sites.

Figure 2:
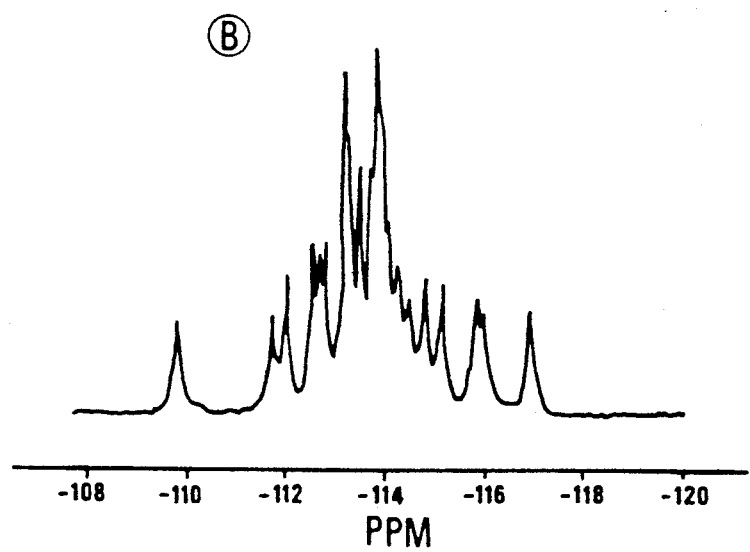

A comparison was made between two crystallized silicas with a MFI structure, one synthesized in an alkaline medium and the other in a fluoride medium using a BRUCKER 400 MHZ NMR apparatus equipped with a sample magic angle spinning means. The spectra are shown in FIGS. 1 and 2. The solids synthesized in a fluoride medium have a spectrum constituted by fine, well separated lines (spectrum B in FIG. 2). However, the solids prepared in the alkaline medium have a poorly resolved spectrum (spectrum A of FIG. 1), which can be explained by the presence of numerous internal Si—OH groups due to the tetrahedral vacancies.

The MFI type solids synthesized in the fluoride medium can consequently be clearly differentiated from MFI type solids synthesized in the alkaline medium with respect to the absence of structural defects, revealed on the one hand by the thermal stability difference and on the other by the resolution difference of the nuclear magnetic resonance spectra. Another difference between solids synthesized in the alkaline medium and those synthesized in the fluoride medium is that the latter contain the element fluorine following the synthesis stage and also following the stage of eliminating the organic compounds. The fluorine content in the zeolite determined by elementary analysis is, for the calcined solids, i.e. those resulting from the aforementioned stage (c), between 0.02 and 1.5% by weight, advantageously between 0.1 and 1.0% by weight and more preferably between 0.2 and 0.8% by weight.

Figure 3:
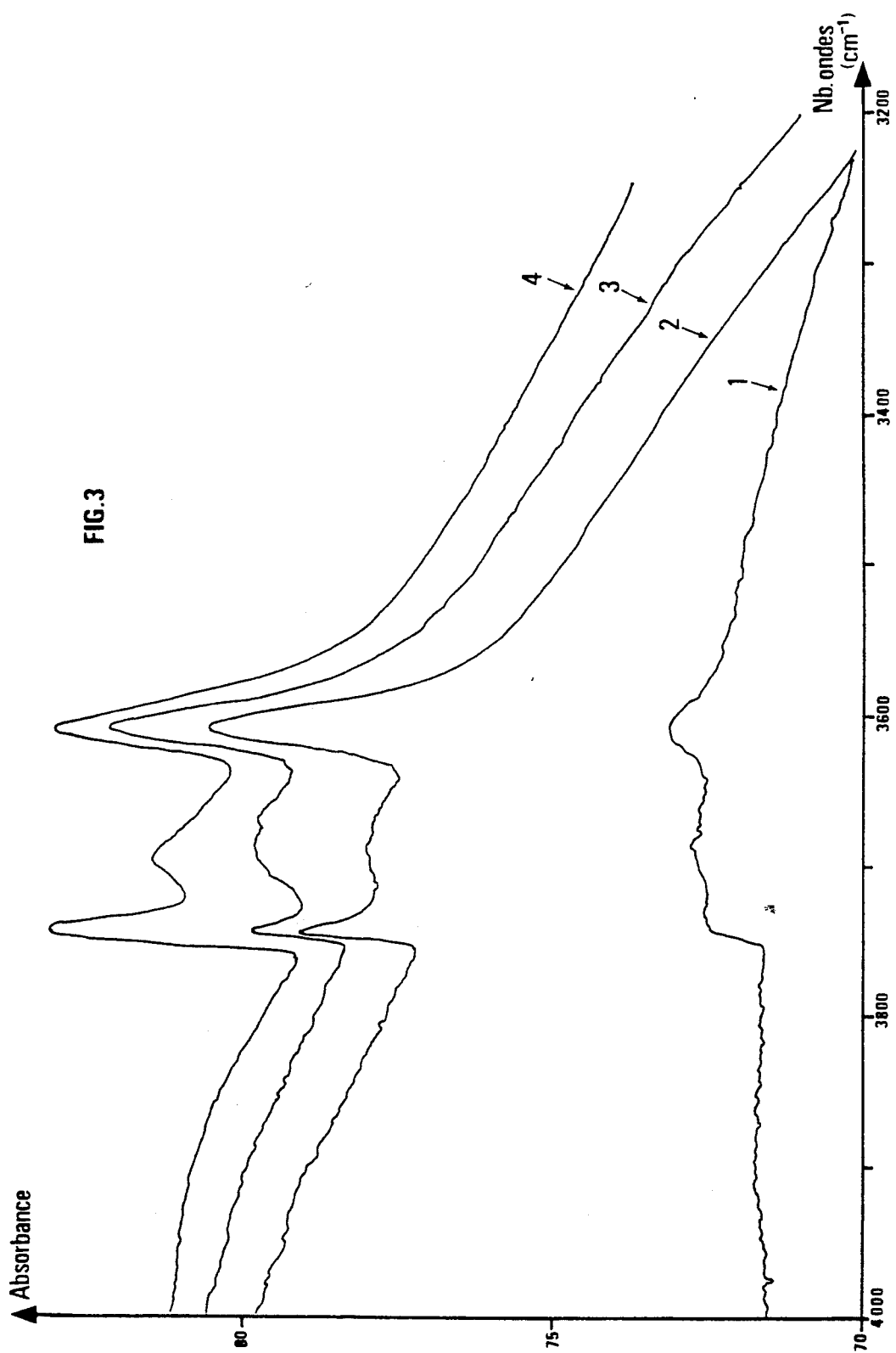

The presence of fluorine in MFI structure zeolites prepared in accordance with the invention gives these solids certain properties, in particular acid and ion exchange properties which are quite different from those of MFI structure zeolites synthesized in the conventional manner, i.e. in the alkaline medium (e.g. U.S. Pat. No. 3,702,886). After synthesis and elimination of the organic compounds by calcination (stages a, b and c), the solids according to the invention are characterized by an infrared vibration spectrum having as illustrated in FIG. 3, for fluorine contents of 0.8% (curve 1), 0.2% (curve 2) and 0.05% (curve 3) bands conventionally attributed to Si-OH groups (zone 3730-3750 cm$^{-1}$) and to structural Al—OH groups (zone 3580-3640 cm$^{-1}$), which are of a very limited intensity compared with those of a conventional MFI structure zeolite with the same Si/Al ratio of 22 (curve 4, F=0).

The absence or virtual absence of structural Al—OH groups in the zeolite according to the invention is confirmed by the ion exchange capacities of these solids. Thus the ion exchange capacities for cations, such as e.g. Na$^+$, K$^+$, Ga$^{3+}$, Pt(NH$_3$)$_4^{2+}$, etc. are well below the total theoretical exchange capacities which could be calculated on the basis of the aluminum content of the crystal lattice.

These solids having few or no structural hydroxyls and whose exchange capacity is very low, surprisingly have remarkable acid properties. Thus, ammonia thermal desorption, which makes it possible to obtain information on the overall acidity of a solid (number and force of the different types of acid sites) reveals that the solids containing fluorine incorporated into the structure are very acid. The ammonia thermal desorption spectra are comparable to those which would be obtained with conventional MFI structure zeolites, but the acidity of the solids according to the invention is of a different nature.

The introduction of fluorine into the zeolites is a method which has already been proposed for increasing the acidity of these solids, e.g. in U.S. Pat. No. 4,540,841. However, in the prior art, the fluorine is introduced into the zeolite by modifications carried out following synthesis. In other words a conventional synthesis is carried out, i.e. in the alkaline medium and then the solid is treated by a conventional fluorination method, in principle making it possible to fix the fluorine. These previously proposed methods generally suffer from major defects. As is the case when the solid is treated by gaseous fluorine, they are e.g. liable to lead to a deterioration of the crystalline order (U.S. Pat. No. 4,297,335). In the present preparation of the catalyst, the fluorine is introduced into the zeolite during synthesis and makes it possible to obtain very well crystallized solids.

By special treatments, it is possible to partly or completely eliminate the fluorine contained in the solids entering the composition of the catalysts according to the invention without any deterioration to their crystallinity. One method which can be used for defluorinating solids is described in European patent application 88 401 871 4 of July 20, 1988.

In conclusion, it is clear that MFI type solids (or of the silica type with an identical structure) synthesized in a fluoride medium differ significantly from their homologs synthesized in the alkaline medium. These distinctions relate to the presence of structural defects revealed by thermal stability and nuclear magnetic resonance tests. They also relate to the presence of fluorine, even after calcination, which influences the type of acid sites, as is demonstrated by the infrared spectroscopy.

In accordance with this invention, these distinctions are used for preparing catalysts for improving the cold behavior of various petroleum fractions. The catalysts according to the invention are superior to those claimed in the prior art. Without being bound by any theory, it is clear that the structural differences on the one hand and acid differences on the other of the solids used contribute to producing distinct catalytic properties.

The MFI type zeolite or silica can then be shaped using a matrix or binder, which can be inert or active for the reaction to be promoted and can also be used alone. The matrixes used (approximately 0.5 to 98% and preferably 10 to 90% of the catalytic mass) are generally chosen from the group of clays or aluminas, silica-magnesia, zirconia, titanium dioxide, boron trioxide, or any combination of the aforementioned products such as silica-alumina, silica-magnesia, etc. All known agglomeration and shaping methods can be used, such as e.g. extrusion, pelletizing, drop coagulation, etc.

The content of MFI or silica with a structure identical to MFI must be between approximately 2 and 99.5 and in preferred manner between 10 and 90% by weight.

The catalyst is associated with a hydrogenating function, such as e.g. at least one metal or a metal compound of group VIII and/or VI B. The hydrogenating function is more particularly constituted by nickel, cobalt, molybdenum or tungsten, preferably at least one of the following group VIII metals: nickel and cobalt or the following pairs of metal oxides: $MoO_3$—NiO, $WO_3$—NiO or $MoO_3$—CoO. These elements are deposited by impregnating the support by solutions of metal salts, such as e.g. acetate, nitrate or chloride for nickel or cobalt, ammonium tungstates or molybdate. In the case of the metal oxide pairs $MoO_3$—NiO, $WO_3$—NiO or $MoO_3$—CoO, the nickel or cobalt salt can be deposited after a first impregnation of the support by the solution of the salt of the group VI B metal, followed by calcination at between 200° and 550° C. It can also be deposited at the same time as the salt of the metal of group VI B. Following the final impregnation, the catalyst is dried at between 80° and 300° C., then calcined between 350 and 700 and preferably between 450° and 600° C. The metal or metal oxide contents of the final catalyst are within the range of 0.5 to 30% and preference is given to:

NiO between 0.5 and 16 and preferably between 2 and 10% by weight

CoO between 0.5 and 16 and preferably between 2 and 10% by weight $MoO_3$ between 0.1 and 25 and preferably between 6 and 20% by weight $WO_3$ between 0.1 and 25 and preferably between 6 and 20% by weight.

The catalyst can also contain other elements, such as in particular phosphorus, introduced in accordance with known methods for hydrotreatment or hydrocracking catalysts.

The thus obtained catalyst is more particularly used for improving, by dewaxing, the cold content of a medium gas oil, characterized by an initial point between 200° and 420° C. and a final point between 320° and 600° C., a sulphur content between 0.1 and 3.5% by weight and with flow and turbidity points above 0° C.

The operating conditions are preferably as follow:

Pressure between 0.5 and 10 MPa and preferably between 1 and 7 MPa

Temperature between 200° and 500° C. and preferably between 250° and 430° C.

Spatial velocity expressed in charge volume per catalyst volume unit and per hour between 0.1 and 4 and preferably between 0.3 and 2

$H_2$/gas oil volume ratio between 100 and 1500 liters per liter and preferably between 200 and 1000 liters per liter.

The use of the catalyst according to the invention in the conditions described hereinbefore leads to improvements to the flow point and turbidity point greater than 10° C. In the case of the catalysts containing the oxide pairs $MoO_3$—NiO, $WO_3$—NiO or $MoO_3$—CoO desulphurization levels above 90% can be obtained.

The following examples illustrate the present invention without in any way limiting it.

EXAMPLE 1

Preparation of Zeolites (solids S1 and S2) used in the composition of catalysts according to the invention.

Two MFI structure zeolites with Si/Al atomic ratios close to 20 and 240 are prepared from the same aluminium and silicon source, namely Tixolex 28, from which the aluminium has been partly removed and using different F/Si atomic ratios in the two reaction mixtures.

Tixolex 28 is a sodium aluminosilicate marketed by Rhône Poulenc and characterized by a Si/Al atomic ratio of 7.3 and a Na/Al atomic ratio of 1.1. The form from which the aluminium has been partly removed is prepared in the following way: 60 g of Tixolex 28 are stirred for 3 hours at ambient temperature with 600 ml of M/2 $HNO_3$. The product obtained is filtered and washed with water to pH 7. After drying at 80° C., it is kept in a relative humidity of 80%. The weight composition is: 76.10% $SiO_2$, 5.46% $Al_2O_3$, 0.24% $Na_2O$ and 17.63% total $H_2O$.

Two reaction mixtures A and B are prepared, their molar and weight compositions being given in table 3. For this purpose, accompanied by stirring, the mixture of $NH_4F$, $N(C_3H_7)_4Br^-$ and water is added to the Tixolex from which the aluminium has been partly removed. The crystallization of the two reaction mixtures A and B is carried out in two autoclaves, whose inner coverings are made from polytetrafluoroethane, at 190° C. for 3.5 days.

TABLE 3

| | Tixolex from which the aluminium has been partly removed | | $NH_4F$ | $N(C_3H_7)_4Br$ | |
|---|---|---|---|---|---|
| | $SiO_2$ | $Al_2O_3$ | | | |
| A | | | | | |
| moles | 0.2 | 0.0084 | 0.04 | 0.1 | 1.6 |
| g | 15.8 | | 1.48 | 26.6 | 28.8 |
| B | | | | | |
| moles | 0.2 | 0.0084 | 0.25 | 0.1 | 1.6 |
| g | 15.8 | | 9.25 | 26.6 | 28.8 |

After crystallization the solids are filtered and washed with a 10% diethylamine solution and then with a hot water solution. The solids are then dried at 80° C. Crystallographic analysis reveals that products S1 and S2 are MFI structure zeolites, whose X-ray diffraction diagram corresponds to the specification of table 1. Chemical analysis of products A and B after calcining in air at 550° C. is as follows:

| Products | S1 | S2 |
|---|---|---|
| Atomic Si/Al | 22 | 240 |

| Products | S1 | S2 |
| --- | --- | --- |
| F(% by weight) | 0.8 | 0.5 |

EXAMPLE 2

Synthesis of Fluorinated Silica with a Structure Identical to MFI (Solid S3) and Used in the Composition of a Catalyst According to the Invention A polymorphous silica with a structure identical to that of MFI is prepared. The silica source is AEROSIL 130 of DEGUSSA. Ammonium fluoride in water is added, accompanied by stirring, followed by tetrapropyl ammonium bromide and finally the aerosil in proportions corresponding to the following formula:

1$SiO_2$, 50$H_2O$, 0.5 $NH_4F$, 0.25 TPA Br.

The gel is then heated at 200° C. for 6 days in an autoclave.

The pH of the mixture, initially 7, moves to about 6.5 at the end of synthesis. The suspension is then filtered, washed with water and dried. The product is calcined at 550° C. to eliminate the organic cations. The fluorine content is 0.5% by weight and the diffraction spectrum is accordance with table 1.

EXAMPLE 3 (NOT IN ACCORDANCE WITH THE INVENTION)

Preparation of MFI Type Solids, Which are not Fluorinated on the One Hand and Fluorinated not in Accordance with the Invention on the Other In a OH$^-$ medium synthesis took place of a MFI structure zeolite of Si/Al ratio 240 using the procedure known from the prior art and described in U.S. Pat. No. 3,702,886. This zeolite undergoes calcination at 550° C. followed by three exchanges in a 3N $NH_4NO_3$ medium. This gives a MFI in proton form, which is free from sodium cations (sodium content below 50·$10^{-6}$ g/g) and designated S4.

This solid then undergoes a treatment at 450° C. under an atmosphere containing $CHF_3$ for 4 hours. At the end of this treatment the fluorine content is 0.15% by weight and its diffraction spectrum, in accordance with table 1, reveals that the product is still well crystallized. This product is designated S5.

A MFI type structure polymorphous silica was also synthesized in the OH$^-$ medium using a procedure known from the prior art and described in U.S. Pat. No. 3,702,886. The solid is calcined at 550° C. prior to subsequent use. Its diffraction spectrum is in accordance with table 1 and this product is designated S6.

EXAMPLE 4

Production of Catalysts.

The catalysts are produced in the following way. The solids designated S and whose preparation is described in the preceding examples, are mixed with an alumina gel of type CATAPAL produced by CONDEA in a dry weight proportion of 40% solid S/60% alumina. The mixture is peptized by adding nitric acid at a rate of 2 g of pure acid per 100 g of mixture and then mixed in a Z-shaped arm mixer. It is then forced through a die, whose holes have a diameter of 1.6 millimeters. The extrudates obtained are dried at 120° C. for 15 hours, then calcined in air at 550° C. for 2 hours.

The thus obtained support is impregnated with an aqueous ammonium paramolybdate solution, then dried at 120° C. and calcined at 350° C. This solid is again impregnated with an aqueous nickel nitrate solution, dried and then calcined at 500° C. The metal oxide content is 2% NiO and 12% $MoO_3$.

Table 4 summarizes the characteristics of the zeolites and catalysts.

TABLE 4

| MFI Type Crystallized Solids | | | | |
| --- | --- | --- | --- | --- |
| Reference | Fluorinated | Fluorine Origin | Si/Al | Catalysts References |
| S1 | yes | Synthesis | 20 | C1 |
| S2 | yes | Synthesis | 240 | C2 |
| S3 | yes | Synthesis | without Al | C3 |
| S4 | non | — | 240 | C4 |
| S5 | yes | Fluorination* | 240 | C5 |

*not in accordance with the invention

EXAMPLE 5

Catalytic Dewaxing Test

The catalysts, whose preparation is described in the preceding examples, undergo a gas oil dewaxing test. The characteristics of the charge appear in table 5. This gas oil is more particularly characterized by turbidity and flow points of approximately +21° C. and a sulphur content of 2.05% by weight.

The tests were carried out under the following conditions:

Total pressure 45 bars
Spatial supply velocity (VVH) in charge volume per catalyst volume unit and per hour 0.5.
$H_2$/gas oil volume ratio 300 liters of gaseous hydrogen/liter of liquid charge.
Temperature variable between 340° and 410° C.

The catalytic system is constituted half by a hydrotreatment catalyst placed at the top of the bed and half by the catalyst to be tested. The first catalyst carries out a partial hydrotreatment of the charge and in particular hydrodesulphurization, hydrodenitrogenation and hydrogenation of the aromatics. The second must also partly ensure these reactions and must in particular carry out the catalytic dewaxing on an already partly purified charge. The catalyst used in the first stage is HR348 marketed by PROCATALYSE and is constituted by nickel and molybdenum deposited on alumina.

TABLE 5

| CHARACTERISTICS OF THE GAS OIL CHARGE | | |
| --- | --- | --- |
| Distillation ASTM D86 (°C.) | Initial Point | 260 |
| | 10% | 296 |
| | 30% | 320 |
| | 50% | 343 |
| | 70% | 366 |
| | 90% | 398 |
| | Final Point | 414 |
| Density | at 20° C. | 0.880 |
| Viscosity (cSt) | at 20° C. | 15.5 |
| (1 cSt = $10^{-6}$ m2/sec) | at 50° C. | 5.9 |
| Refractive index | at 20° C. | 1.4894 |
| Aniline point (°C.) | | 72.6 |
| Sulphur (% by weight) | | 1.3% |
| Nitrogen (ppm) | | 310 |
| Flow point (°C.) | | +15 |
| Turbidity point (°C.) | | +16 |

The test is carried out in the following way. Following the charging of the catalysts, the latter are presulphurized by the hydrogen/hydrogen sulphide mixture. The pressure is then raised to 45 bars and the charge injected at 150° C. and progressively raised to 340° C. After 48 hours at this temperature, it is increased to 360° C. for 48 hours and then to 380° C. for 48 hours.

The performance characteristics of the catalysts given in table 2 are expressed with the aid of the following:

170+ fraction weight yield (170+ yield)

Turbidity and flow points of the 170+ fraction. The turbidity point corresponds to the temperature at which the first wax crystals appear. The flow point corresponds to the solidification temperature of the solid.

Table 6 gives the performance characteristics of catalysts C1 to C5.

TABLE 6

|          | Flow Point | | | Turbidity Point | | | 170+% Yield | | |
|----------|-----|-----|-----|-----|-----|-----|-----|-----|-----|
|          | 340 | 360 | 380 | 340 | 360 | 380 | 340 | 360 | 380 |
| Catalyst |     |     |     |     |     |     |     |     |     |
| C1       | −9  | −33 | −50 | 6   | −10 | −25 | 91  | 88  | 86  |
| C2       | 0   | −9  | −32 | 8   | −7  | −18 | 94  | 90  | 89  |
| C3       | 12  | −6  | −18 | 15  | 3   | −2  | 96  | 95  | 93  |
| C4       | +9  | −6  | −15 | 12  | 2   | −10 | 94  | 88  | 86  |
| C5       | +6  | −6  | −15 | 9   | 1   | −6  | 90  | 87  | 86  |

Catalysts C1 and C2, which contain zeolites synthesized in the fluoride medium make it possible to obtain the lowest flow and turbidity points. Catalyst C3, with a MFI structure silica synthesized in the fluoride medium, is less active than the two first-mentioned catalysts, but still represents a good compromise between the improvement to the cold behaviour and the liquid yield. Catalysts C4 and C5, which contain zeolites synthesized in the alkaline medium, one having been fluorinated by a treatment not in accordance with the invention, are less active than catalyst C2 with which they must be compared. Catalyst C2, according to the invention and synthesized in the fluoride medium and with a Si/Al ratio equal to 240 consequently has the best gas oil dewaxing characteristics.

What is claimed is:

1. A process for dewaxing of petroleum fractions to provide an improvement in the cold flow properties of said petroleum fractions which comprises contacting a petroleum fraction charge under dewaxing conditions with a catalyst containing by weight:
    (a) 2 to 95% of a zeolite of MFI structure or a silica with MFI framework topology, said zeolite or said silica having been synthesized in a fluoride medium and having a fluoride content between approximately 0.02 and 1.5% by weight, said zeolite or said silica being characterized by an X-ray diffraction diagram shown in Table 1 of the specification,
    (b) 0.5 to 98% of a matrix, and
    (c) 0.5 to 30% of at least one group VIII or VI B metal of the periodic classification of elements.

2. A process according to claim 1, wherein said catalyst contains:
    (a) 10 to 90% of said zeolite or said silica,
    (b) 10 to 90% of said matrix, and
    (c) at least one oxide selected from the group consisting of:
    NiO with a weight concentration between 0.5 and 16%,
    CoO with a weight concentration between 0.5 and 16%,
    $MoO_3$ with a weight concentration between 0.1 and 25%, and
    $WO_3$ with a weight concentration between 0.1 and 25%.

3. A process according to claim 2, wherein said zeolite or said silica contains 0.1 to 1% by weight of fluorine.

4. A process according to claim 2, wherein said catalyst contains at least one oxide pair selected from the group consisting of $MoO_3$—NiO, $WO_3$—NiO and $MoO_3$—CoO.

5. A process according to claim 1, wherein the petroleum fraction charge contains a gas oil.

* * * * *